(12) United States Patent
Schmitt et al.

(10) Patent No.: US 7,498,373 B2
(45) Date of Patent: Mar. 3, 2009

(54) HOT SEALING COMPOUND FOR ALUMINUM FOILS APPLIED TO POLYPROPYLENE AND POLYSTYRENE

(75) Inventors: Guenter Schmitt, Darmstadt-Arheiligen (DE); Michael Wicke, Seeheim-Jugenheim (DE); Juergen Hartmann, Griesheim (DE); Klaus Schultes, Wiesbaden (DE); Helmut Schwind, Hanau (DE); Thomas Arnold, Gelnhausen-Haitz (DE)

(73) Assignee: Roehm GmbH & Co. KG, Darmstadt (DE)

( * ) Notice: Subject to any disclaimer, the term of this patent is extended or adjusted under 35 U.S.C. 154(b) by 248 days.

(21) Appl. No.: 10/470,276

(22) PCT Filed: Feb. 5, 2002

(86) PCT No.: PCT/EP02/01143

§ 371 (c)(1),
(2), (4) Date: Jan. 6, 2004

(87) PCT Pub. No.: WO02/068557

PCT Pub. Date: Sep. 6, 2002

(65) Prior Publication Data

US 2004/0116567 A1    Jun. 17, 2004

(30) Foreign Application Priority Data

Feb. 7, 2001   (DE) ................................ 101 05 818
Oct. 18, 2001  (DE) ................................ 101 50 898

(51) Int. Cl.
   *C08K 5/101*   (2006.01)
(52) U.S. Cl. .................... 524/315; 524/522; 524/523
(58) Field of Classification Search ................ 524/315, 524/522, 523
See application file for complete search history.

(56) References Cited

U.S. PATENT DOCUMENTS

| | | | |
|---|---|---|---|
| 4,753,708 A * | 6/1988 | Markert et al. ............... 156/327 |
| 4,833,221 A | 5/1989 | Albrecht |
| 5,110,877 A | 5/1992 | Hoess et al. |
| 5,155,172 A | 10/1992 | Siol et al. |
| 5,219,931 A | 6/1993 | Siol et al. |
| 5,270,397 A | 12/1993 | Rhein et al. |
| 5,280,073 A | 1/1994 | Siol et al. |
| 5,548,033 A | 8/1996 | Vetter et al. |
| 5,652,316 A | 7/1997 | May et al. |
| 5,705,189 A | 1/1998 | Lehmann et al. |
| 6,040,387 A | 3/2000 | Albrecht et al. |
| 6,287,470 B1 | 9/2001 | Vetter et al. |
| 6,355,712 B1 | 3/2002 | Schultes et al. |
| 6,498,209 B1 | 12/2002 | Loehden et al. |
| 6,566,441 B1 | 5/2003 | Lohden et al. |
| 6,576,255 B1 | 6/2003 | Petereit et al. |
| 6,613,871 B2 | 9/2003 | Hoess et al. |
| 6,765,046 B1 | 7/2004 | Numrich et al. |
| 6,803,416 B2 | 10/2004 | Schultes et al. |
| 6,809,163 B2 | 10/2004 | Schultes et al. |
| 6,890,993 B2 | 5/2005 | Schultes et al. |
| 6,989,409 B2 | 1/2006 | Loehden et al. |
| 6,998,140 B2 | 2/2006 | Meier et al. |
| 7,046,952 B2 | 5/2006 | Kurotori et al. |
| 7,049,355 B2 | 5/2006 | Quis et al. |
| 7,179,852 B2 | 2/2007 | Schultes et al. |
| 2002/0160042 A1 | 10/2002 | Petereit et al. |
| 2004/0104501 A1 | 6/2004 | Petereit et al. |
| 2004/0116567 A1 | 6/2004 | Schmitt et al. |
| 2005/0065224 A1 | 3/2005 | Menzler et al. |
| 2005/0267250 A1 | 12/2005 | Theil et al. |
| 2006/0052515 A1 | 3/2006 | Schultes et al. |
| 2006/0121248 A1 | 6/2006 | Lorenz et al. |
| 2006/0147714 A1 | 7/2006 | Schultes et al. |
| 2007/0055017 A1 | 3/2007 | Schultes et al. |
| 2007/0066708 A1 | 3/2007 | Goldacker et al. |
| 2007/0068088 A1 | 3/2007 | Einfeldt et al. |
| 2007/0112135 A1 | 5/2007 | Wicker et al. |
| 2007/0117948 A1 | 5/2007 | Loehden et al. |
| 2007/0122624 A1 | 5/2007 | Schultes et al. |
| 2007/0123610 A1 | 5/2007 | Schultes et al. |
| 2007/0193156 A1 | 8/2007 | Kautz et al. |
| 2007/0193159 A1 | 8/2007 | Schattka et al. |
| 2007/0193478 A1 | 8/2007 | Schattka et al. |
| 2007/0196655 A1 | 8/2007 | Schattka et al. |
| 2007/0197671 A1 | 8/2007 | Schattka et al. |
| 2007/0197689 A1 | 8/2007 | Kautz et al. |
| 2007/0197690 A1 | 8/2007 | Schattka et al. |
| 2007/0197691 A1 | 8/2007 | Kautz et al. |
| 2007/0204543 A1 | 9/2007 | Schattka et al. |
| 2007/0204544 A1 | 9/2007 | Kautz et al. |
| 2007/0208107 A1 | 9/2007 | Schattka et al. |
| 2007/0208109 A1 | 9/2007 | Kautz et al. |
| 2007/0222117 A1 | 9/2007 | Hoess et al. |
| 2007/0259987 A1 | 11/2007 | Schattka et al. |
| 2007/0276093 A1 | 11/2007 | Schultes et al. |
| 2008/0057205 A1 | 3/2008 | Lohden et al. |

FOREIGN PATENT DOCUMENTS

| EP | 547504 A2 * | 6/1993 |
|---|---|---|
| EP | 1 057 867 | 12/2000 |
| EP | 1057867 A1 * | 12/2000 |

OTHER PUBLICATIONS

U.S. Appl. No. 11/571,115, filed Dec. 21, 2006, Schattka et al.
U.S. Appl. No. 11/997,621, filed Feb. 1, 2008, Loehden et al.
U.S. Appl. No. 12/064,245, filed Feb. 20, 2008, Schattka et al.
U.S. Appl. No. 60/975,574, filed Sep. 27, 2007, Kuppert et al.
U.S. Appl. No. 12/094,277, filed May 20, 2008, Schultes et al.

* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention relates to a hot sealing system comprised of an olefin polymer or of an olefin polymer A, of a methacrylate polymer B, of a graft polymer A-X consisting of the above-mentioned constituents and of a solvent or solvent mixture. The hot sealing system is characterized by having a high thermal stability and short sealing times.

3 Claims, No Drawings

HOT SEALING COMPOUND FOR ALUMINUM FOILS APPLIED TO POLYPROPYLENE AND POLYSTYRENE

FIELD OF THE INVENTION

The sector for food-and-drink packaging and tablet packaging has for some time now used not only polystyrene (PS) and polyvinyl chloride (PVC) but also polypropylene (PP) and polyethylene terephthalate (PET). Polypropylene with no pretreatment is a very critical plastic for the coatings sector, because adhesion problems very often occur. Although these problems take on a somewhat different aspect in the case of hot sealing to polypropylene (PP not being coated here but adhered), they are nevertheless likewise present. For example, the polymethacrylate resins which have proven successful in the sealing of polystyrene or of PVC, e.g. PLEXIGUM P 24 or PLEXIGUM N 80, cannot be used because they cannot achieve the seal seam strength.

PLEXIGUM P24 is a copolymer of methyl methacrylate and butyl methacrylate, and is marketed by Röhm GmbH & Co. KG.

PLEXIGUM N80 is a methyl acrylate-ethyl methacrylate copolymer, and is likewise marketed by Röhm GmbH & Co. KG.

By using PLEXISOL PM 555 (producer: Röhm GmbH & Co. KG), a specific, solvent-containing binder system based on polyolefin/polymethacrylate in butyl acetate/methyl ethyl ketone, it has proven possible to develop a binder which has excellent suitability for the sealing of aluminum foil to polypropylene. Furthermore, indeed, PLEXISOL PM 555 also permits equally good seals to be produced to polystyrene and PVC.

To achieve adhesion of aluminum to PVC copolymers, e.g. ®VINYLITE VMCH, PLEXISOL PM 555 has to be applied over a primer, but it can also be used appropriately combined in the form of a single-layer system.

Vinylite VMCH is an acid-containing PVC polymer (marketed by Union Carbide).

Prior Art

Plastics products are nowadays widely used to replace vessels and containers composed of wood or of inorganic materials, such as metal, glass, ceramics. In all cases, the requirements are particularly stringent if the vessels or containers are used for the storage or preservation of food or drinks.

A decisive aspect of the preservation of food or drinks, whether via dehydration, freezing, or sterilization, is the complete prevention of microbial growth. This frequently means that the containers have to be sealed so as to be gastight. Other facts which have to be taken into account with plastics containers are mechanical stability, control of water content, and also the action of the atmosphere and of light. (Cf. Ullmann's Encyclopedia of Industrial Chemistry 25$^{th}$ Ed. Vol. All, 523-560; 583-618 VCH 1988; this reference also deals with the applicable standards).

Food-and-drink technology makes wide use of an aluminum lid coated with a sealable coating for the closure of plastics vessels, especially for dairy products, such as yoghurt cups.

Many of these aluminum lids are a three-layer laminate, the outer layer of which is often composed of (biaxially oriented) polyethylene terephthalate (OPET), of biaxially oriented polypropylene (OPP), or of polyamide (OPA), or of cellulose. In contrast, the hot-sealable inner layer is usually composed of polyethylene, of ethylene copolymers, or of polypropylene (U.S. Pat. No. 4,753,708; G. Stehle, Neue Verpackung 9/91, pp. 94-101). However, there is increasing discussion of economic and environmental reasons for avoiding the use of aluminum, e.g. for food-and-drink packaging, in particular the high cost of energy for aluminum production.

Use is therefore also made of plastics films instead of aluminum, these having a sealable coating. This sealable coating is adapted to the plastic used. A very considerable part is played by rigid PVC, which is a relatively low-cost material for sealable films with good mechanical strength and good barrier properties, the sealable coating layer used here usually being an acrylic resin whose adhesion and melting point can be modified advantageously via additives.

DE-A 35 31 036 describes coextrudable plastics films which are composed of a sealable layer of impact-modified polystyrene, and of a block copolymer, and of a lubricant.

However, EP-A-0 406 681 rightly points out the problems with use of hot-sealable plastics films instead of aluminum foil. A restriction generally discernable is the substantially reduced processing latitude. The resultant processing range is mostly very narrow, from 10 to 20° C., fairly constant compliance with this range being necessary to ensure problem-free production and satisfactory use of the sealed pack. Filling systems with a number of cavities for the simultaneous filling of cups do not always comply with this precondition. EP-A 0 406 681 had the object of improving the polystyrene-based films which could be produced by the coextrusion process as claimed in DE-A 35 31 036 inter alia in such a way as to increase processing latitude and processing reliability.

A further intention was to ensure satisfactory production, even on filling systems with a number of filling cavities. In practice this means the use of relatively high seal temperatures, with corresponding requirements placed upon the quality of the plastics films.

According to EP A 0 406 681, these requirements were fulfilled by a sealable plastics film produced by the coextrusion process or by lamination and composed of two layers A and C and, where appropriate, of a layer B, and also, where appropriate, in each case a layer of an adhesion promoter D for the bonding of each pair of the layers A, and where appropriate B and C, and composed of from 1 to 50% of a layer of a hot-sealable, impact-modified polystyrene A, up to 95% of a backing layer B, and from 1 to 99% of a high-melting plastics layer C, the total of the thicknesses or of the weight of A and, where appropriate, B and C always being 100.

Object

An object was to achieve high adhesion even at relatively high temperatures (high heat resistance), since this achieves short cycle times during coating of the film and for the packager of food or drink.

Another object was to improve the known hotseal composition for aluminum foils and for plastics films in such a way as to permit the use of a solvent system that has been listed in the HAPS list, instead of the solvent-containing binder system usually used hitherto and composed of butyl acetate and methyl ethyl ketone. It is also desirable to achieve adequately high closure strengths at the usual cycle times used during the hot sealing of aluminum foils or of plastics films.

Another object was to develop a hot seal composition which remains stable in the, to the printing process which follows the application of the hot seal composition. Binders of the prior art can give rise to deposits on the transport rollers of the printing machine after short printing times, so that reliable transport of the film to be printed becomes impossible. The printing machine has to be stopped, partially dismantled, and cleaned. The set-up times and cleaning times required for this are sometimes out of proportion to the machine running time. Using the binder of the invention, problem-free printing is possible over a long period.

Solution

The object is achieved through a film-forming dispersion made from at least two different polymer types A and B, polymer type A being an olefin copolymer (OCP) or an olefin polymer. The ratio A:B by weight of two polymer types present is from 0.4:1 to 2:1, and the dispersion comprises a polymer containing components which correspond to the two polymer types A and B.

The olefin polymers and olefin copolymers to be used as A according to the invention are known per se. These are primarily the polymers previously recommended as hot-sealable compositions, composed of ethylene, propylene, butylene and/or other α-olefins having from 5 to 20 carbon atoms. The molecular weight is generally from 10,000 to 300,000, preferably from 50,000 to 150,000. Olefin copolymers of the type to be used are described by way of example in the German laid-open specifications DE-A 16 44 941, DE-A 17 69 834, DE-A 1939 037, DE-A 19 63 039 and DE-A 20 59 981.

An example of an olefin polymer which may be used is Buna 6170 (producer: Bayer AG).

Ethylene-propylene copolymers are particularly useful; terpolymers are also possible with addition of the known ter-components, such as ethylidenenorbornene (cf. Macromolecular Reviews, Vol. 10 1975), but their tendency toward crosslinking during the ageing process has to be included in calculations. The distribution here may be substantially random, but it is also possible and advantageous to use sequenced polymers having ethylene blocks. The ratio of the ethylene/propylene monomers here is variable within certain limits, which can be set with about 95% for ethylene and about 95% for propylene as upper limit.

Polymer type B is defined as composed of polyacrylate sequences and/or of polymethacrylate sequences. These are in themselves, e.g. in the form of a corresponding homo- or copolymer, soluble in the solvent system L. The polymer B or segment X is generally composed of more than 50% by weight, preferably from 80 to 100% by weight (e.g. when referring to the segment X) of monomers of the formula I

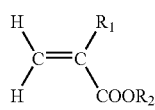

where $R_1$ is hydrogen or methyl and $R_2$ is an alkyl radical, or an araliphatic or aromatic radical having from 1 to 30 carbon atoms, preferably from 1 to 20 carbon atoms.

Polymer B may also contain:

Monomers of the formula II

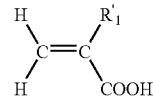

where $R'_1$ is hydrogen or methyl, or/and may contain polymerizable anhydrides and/or monomers of the formula III

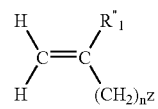

where $R''_1$ is hydrogen or methyl and Z is an unsubstituted or alkyl-substituted phenyl radical, a —$COR_3$ radical, a $$\underset{OCR_3}{\overset{O}{\|}} \text{ radical,}$$

an —$OR_4$— radical or a chlorine atom, and where $R_3$ and $R_4$ are an unbranched or branched alkyl radical having from 1 to 20 carbon atoms or a phenyl radical, and n is 0 or 1, and/or monomers of the formula IV

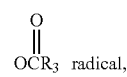

where $R_5$ and $R_6$ are hydrogen or a —$COOR'_7$ radical, $R_6$, hydrogen, or a —$CH_2COOR''_7$ radical, with the proviso that the compound of the formula IV has to contain two carboxy-containing groups, and where $R_7$, $R'_7$ and $R''_7$ are hydrogen or an unbranched or branched alkyl radical having from 1 to 20 carbon atoms or phenyl. Polymer B may, where appropriate, also contain fractions of the monomers of the formula V $$\underset{H}{\overset{H}{\diagdown}} C = C \underset{Bs}{\overset{R'''_1}{\diagup}} \quad V$$

where $R'''_1$ is as defined for $R_1$ and Bs is a nitrogen-containing functional radical, such as a —CN group, or a —$CONR_9R_{10}$ group, where $R_9$ and $R_{10}$, independently of one another, are hydrogen or an alkyl radical having from 1 to 20 carbon atoms, or where $R_9$ and $R_{10}$ together with the nitrogen form a heterocyclic 5-membered or 6-membered ring, or where Bs is an (inert) heterocyclic radical, in particular a pyridine, pyrrolidine, imidazole, carbazole, or lactam radical or alkylated derivatives of the same, or Bs is —CH$_2$OH, or where Bs is

where Q is an unsubstituted or alkyl-substituted alkylene radical having from 2 to 8 carbon atoms and R$_{11}$ is —OH, —OR'''$_7$, or an —NR'$_9$R'$_{10}$ radical, where R'''$_7$, R$_9$ and R'$_{10}$ are defined as for R$_7$, R$_8$ and R$_9$, e.g. together with the nitrogen atom, where appropriate together with another heteroatom, to form a 5- to 6-membered heterocyclic ring.

Methyl methacrylate, ethyl methacrylate, propyl methacrylate, butyl methacrylate, and isobutyl methacrylate are mentioned by way of examples for the monomers of the formula I. The monomers of the formula I are also termed standard methacrylates.

Acrylic acid or methacrylic acid are mentioned by way of examples of the monomers of the formula II.

Styrene, α-methylstyrene, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleate, dilauryl maleate and dibutyl itaconate are mentioned by way of particular examples of monomers of the formulae III and IV. The proportion of the monomers of the formula II-V in segment X' is generally from 0 to 50% by weight, preferably from 0 to 20% by weight (based on the monomers of the segment X'). The proportion of the monomers of the formulae II and/or V in the segment X' will not generally exceed 20% by weight, and is generally from 0 to 10% by weight, preferably from 0 to 5% by weight.

The detailed content and constitution of the segment X will advantageously be selected with a view to the desired technical function. The proportion of the polar monomers of the formulae II and V will generally not exceed 20% by weight, and is preferably from 0 to 10% by weight (based on the monomers of the segment X'), particularly preferably from 0 to 5% by weight. As monomers of the formula V, mention may be made of C- and N-vinylpyridine, and also vinylpyrrolidine, vinylpyrrolidone, vinylcarbazole, vinylimidazole and also alkyl derivatives of these, in particular the N-vinyl compounds, and the hydroxy- and dialkylaminoalkyl esters of (meth)acrylic acid, specifically dimethylaminoethyl (meth)acrylate, dimethylaminopropyl (meth)acrylate, hydroxyethyl (meth)acrylate. The segments B and X generally have a weight ratio of 1:20 to 20:1, preferably 1:4 to 1:1.

The hot seal system also comprises a polymer AX, which is a polyolefin grafted with B.

In general: the graft polymer A-X is generally prepared by using a suitable emulsifier to prepare a dispersion from component A, and grafting component X onto this under the reaction conditions suitable for this purpose. The structure of the emulsifier may be similar to that of the A-X system. The processes for preparing suitable emulsifiers of A-X type are known per se. The transfer-grafting method may be used, for example.

Preparation of graft polymers AX

In general: the graft polymer A-X is generally prepared by using a suitable emulsifier to prepare a dispersion from component A, and grafting component X onto this under the reaction conditions suitable for this purpose. The structure of the emulsifier may be similar to that of the A-X system. The processes for preparing suitable emulsifiers of A-X type are known per se. The transfer-grafting method may be used, for example. (Cf. also Houben-Weyl, Methoden der Org. Chemie [Methods of Organic Chemistry], Vol. 1411, p. 114, H. A. J. Battaerd, G. W. Tregear, Polymer Reviews, Vol. 16, Interscience (1967)).

For this, a 10-50% strength, preferably 20-30% strength, solution of an OCP is prepared in a suitable solvent which is inert under polymerization conditions and which has a normal boiling point above the process temperature. Examples of solvents which may be used are butyl acetate or aliphatic, cycloaliphatic, or aromatic hydrocarbons. The monomers of the formula I and respectively, in some cases, the other monomers II-III are added in the stated ratios to these OCP solutions, and the mixture is polymerized with addition of one or more, preferably peroxidic, free-radical initiators at 50 temperatures of 60-150° C., usually within from 4 to 8 hours. Maximum possible conversion is desirable. It is preferable to use peresters, such as tert-butyl peroctoate. The initiator concentration depends on the number of desired grafting sites and on the desired molecular weight of the segment X. The initiator concentration is generally from 0.2 to 3% by weight, based on the polymer.

Where appropriate, concomitant use may also be made of regulators to set the desired molecular weight of the segments X. Examples of suitable regulators are sulfur regulators, in particular regulators containing mercapto groups, e.g. dodecyl mercaptan. The concentrations of regulators are generally from 0.1 to 1.0% by weight, based on the entire polymer. Another method of preparing the graft polymers A-X is hydroperoxidization of an OCP as first step. The hydroperoxide groups thus formed and situated on the chain can initiate the graft polymerization of the vinyl monomers in a subsequent stage. (Cf. H. A. J. Battaerd, G. W. Tregear, Polymer Reviews loc. cit.).

An example of a process for preparing suitable block polymers is anionic polymerization. An example of a procedure here uses a suitable anionic initiator (e.g. an organometallic compound) to polymerize isoprene and, respectively, butadiene, and reacts the "living" anionic chain ends with, for example, alkyl methacrylate and, respectively, styrene. The resultant polymers are then hydrogenated under conditions under which the functional groups present are not attacked. For details of the preparation, reference may be made to the relevant literature, e.g. Houben-Weyl, Methoden der Org. Chemie [Methods of Organic Chemistry], 14/1, pp. flOff.; Block Copolymers, 5 D. C. Allport, W. H. Janes, Appl. Sci. Publishers Ltd., London, 1973; Graft Copolymers, H. A. J. Battaerd, G. W. Tregear, Polymer Reviews Vol. 16 (1967); Block and Graft Polymers. W. J. Burlant, A. S. Hoffmann, Reinhold Publishers Corp., New York, 1960.

Besides polymer types A and B and the graft polymer AX, the hot seal system of the invention also comprises a solvent system.

The solvents to be used for the solvent system L are to be selected to meet the requirements of coating technology for plastics and metals. The solvents to be used— where appropriate in a mixture— are to be inert and entirely non-hazardous, while the boiling point does not exceed 105 C at 760 torr.

The solvent which may be used is a mixture of esters of aliphatic carboxylic acids with aliphatic alcohols and aliphatic hydrocarbons.

An aliphatic carboxylic acid which may be used is acetic acid, propynoic acid, or butyric acid.

Aliphatic alcohols which may be used are ethanol, propanol, isopropanol, n-butanol, 2-butanol, 2-methyl-1-propanol, or 2-methyl-2-propanol.

Aliphatic hydrocarbons which may be used are pentane, hexane, heptane, octane, nonane, decane, undecane or dodecane.

The aliphatic hydrocarbons may also be used in the form of their isomer mixtures, and in mixtures with one another. It is also possible to use cycloalkanes and substituted cycloalkanes.

During the selection of L, attention has also to be paid to compatibility between the polymer components A and X. If there is incompatibility between A and X, L may be an equally good solvent for both components, and the incompatibility then leads to formation of the dispersion.

If there is compatibility between A and X, the selection of L has to be such that at a given temperature it is a better solvent system for X than for A, and the different solution properties then lead to formation of the dispersion. A solvent L selected according to the invention is preferably one which, in the temperature range from 40 to 150° C., can swell the olefin copolymers to the extent of from 5 to 300% by weight ("degree of swelling").

The degree of swelling is defined as follows: an OCP film of thickness 1 mm, length 2 cm, width 0.5 cm and of known weight is immersed in the solvent at a defined temperature—in the instance documented by way of example at 90° C.—and held isothermally for 24 hours, removed from the solution using tweezers, freed from adhering swelling agent by means of a filter paper, and then immediately weighed. The percentage increase in weight, based on the initial weight, is defined as the measure of swelling. The swelling measurement is to be carried out at the temperature at which the concentrated OCP dispersion is to be prepared. According to the invention, the swelling at this temperature is to be from 5 to 300% by weight. A precondition for the applicability of the criterion is that the maximum swelling of the OCP is achieved under the conditions given above.

Mixtures of the solvents described above may also be used for the medium. The proportion of the solvent system L in the concentrated polymer dispersions of the invention may be 80% by weight, for example, or in a particularly advantageous instance as low as 20% by weight, preferably below 70% by weight, in practice mostly from 55 to 40% by weight.

Preparation of Hot Seal System

A suitable emulsifier is used, as explained above, to prepare a dispersion, or in the case of suitably matched polymer compatibility a homogeneous solution, of component A in the solvent system L, and component X is grafted onto this under suitable reaction conditions. The ratios by weight of the proportions of A and X are generally from 1:5 to 5:1. The content of the entire polymer, based on the entire dispersion, is at least 10% by weight, desirable contents in practice being from 40 to 80% by weight, normally from 45 to 60% by weight.

The process of the invention gives hot-sealable coating compositions in dispersion which have sufficient stability for processing. The dispersions are stable for at least two or more days, normally for two or more weeks to months.

The hot seal systems of the invention have moderate adhesions and high heat resistance.

EXAMPLES

Foil and Film Material Used
Flexible 40 μm aluminum foil
Polypropylene film extruded from JE 6100 pellets (Shell) 0.2 mm Mixing Specification for Hot Seal Solution PLEXISOL PM 555 requires thorough stirring prior to processing, since phase separation can occur on prolonged storage.

PLEXISOL PM 555 as supplied (producer: Röhm GmbH & Co. KG) has a solids content of about 45%, and for further processing is diluted to 30% using MEK. PVC copolymers have proven successful for promoting adhesion to the aluminum foil. They are either applied as a primer or used in combination with PLEXISOL PM 555. In our studies, both possibilities were tested. Vinylite VMCH was used as a primer and used in combination which VMCH in a ratio of 99/1 to 90/10 and, respectively, 85/15.

Laboratory Application of Hot Seal Solution

The primer coat was a 10% strength solution of Vinylite VMCH in ethyl acetate, coated onto the aluminum foil (10× 20 cm) using the No. 2 K-Handcoater. This corresponds to a dry layer of from 0.5 to 1.5 um.

The PLEXISOL PM 555 hot seal solution was coated using the No. 4 K-Handcoater. The dry layer thicknesses obtained here were from 7 to 9 μm.

Laboratory Drying of Coated Films

After a short air-drying period (from 10 to 20 minutes), the primed film was dried in a convection oven at 180° C. for 1 minute.

The films coated with hot seal coating were dried at various temperatures (160° C., 200° C.) for 1 minute, and also at 205° C. for 5 seconds, this being a conventional method often used in industry.

Hot Sealing and Determination of Seal Seam Strength after Exposure to Various Conditions The Brugger hot sealer (HSG/ET) was used to produce the seals.

Sealing Conditions:

| | |
|---|---|
| Temperature: | 180° C., 200° C., 220° C. |
| Pressure: | 6 bar |
| Time: | 1 sec. |
| Seal area: | 10 × 10 mm |

To determine seal seam strength, specimens were cut into strips of width 15 mm and subjected to tension at a velocity of 100 mm/min., using the Instron tensile tester, model No. 1195, or the Zwick tensile tester, model No. 1454. During the peel test it was ensured that the angle formed between the film sections already separated from one another and the remainder not yet subjected to stress was 90° C.

The tests were generally carried out without prior stressing of the sealed specimens, but were also carried out after 28 days in mains water at 23° C. and 1 hour in water at +80° C.

The bursting-pressure resistance of the films sealed using the composition of the invention was determined by a method based on the data sheet for the testing of packaging, No. 41, published as applied science annex to "Verpackungs-Rundschau", 32 (1981), No. 8, p. 58.

PP cups were sealed using a VL-1600 laboratory cup sealer from BHS.

Hot Sealing and Determination of Bursting-pressure Resistance after Exposure to Various Conditions The seals were produced using the VL-1600 laboratory cup sealer from BHS. Uniplast E 30 cups from Knauer with an external diameter of 7.5 cm were used here.

Sealing Condition:

| Temperature: | 180° C., 200° C., 220° C. |
| Pressure: | 0.75 bar (cor. to 1400 N total sealing system pressure) |
| Time: | 0.65 sec. |

Specimens of diameter 7.5 cm were stamped out from the foil (stamping equipment built in-house), and placed onto the cup, filled to about 1 cm below the rim with water at about 70° C., and sealed. Bursting-pressure resistance was determined after 4 different types of stress:
  a) immediately after sealing
  b) after 30 min. of cooling at room temperature
  c) after 28 days of storage of the cup with the seal surface downward
  d) after 1 hour in water at 80° C. and 30 min. of cooling at room temperature Measurement of bursting-pressure resistance immediately after sealing is a measure of heat resistance. The measurement after cooling serves to establish the underlying strength of the material in its usage condition, or an initial value for stability measurements.

Results of Experiments

See Table

Solvent Systems Comparison

Hot Seal Properties

| Description | Polymer | Solvent | HSS [N/15 mm] Alu against PP | | Bursting-pressure resistance [bar] 70° C. H₂0 | |
|---|---|---|---|---|---|---|
| | | | Normal | 48 h H₂0 | immediately | 30' |
| Example 1 | Buna 6170 -n-BMA-MMA | Propyl acetate - isooctane - ethyl acetate | 9.1 | 8.9 | 0.62 | 0.82 |
| Example 2 | ditto | ditto | 9.3 | 9.7 | 0.63 | 0.68 |
| Example 3 | ditto | ditto | 8.8 | 9.5 | 0.67 | 0.90 |
| Comparison 1 | Buna 6170-n-BMA-MMA | Butyl acetate - methyl ethyl ketone | 9.5 | 8.9 | 0.50 | 0.54 |
| Comparison 2 | ditto | ditto | 10.2 | 10.4 | 0.50 | 0.59 |

Drying conditions: in each case 1' 180° C.

Sealing conditions: 6 bar, 200° C., 1" (HSF); 0.75 bar, 200° C., 0.65" (bursting pressure); all of the films are primed with Vinylite VMCH.

| Constitution of polymer: | Constitution of solvent: |
|---|---|
| Buna 6170: 54% by weight | Propyl acetate: 54% by weight |
| n-Butyl methacrylate: 23% by weight | Isooctane: 9.5% by weight |
| Methyl methacrylate: 23% by weight | Ethyl acetate: 36.5% by weight |

43% strength in the solvent

The invention claimed is:

1. A hot-sealable coating system suitable for the sealing of various types of substrate and composed of a film-forming dispersion made from at least two different polymer types A and B, and of an organic solvent system L, comprising:
  a polymer type A which is an olefin polymer or an olefin copolymer,
  a polymer type B which is a (meth)acrylate copolymer, containing standard (meth)acrylates and a total of up to 15% of methacrylic acid and/or acrylic acid, and/or another polymerizable acid,
  and the ratio A:B by weight of the two polymer types present ranges from 0.4:1 to 2:1, and the dispersion comprises a polymer containing components which correspond to the two polymer types A and B; and wherein
  the organic solvent system L consists of a mixture of 40-70% by volume of propyl acetate, 24-45% by volume of ethyl acetate, and 5 to 15% by volume of isooctane.

2. A process for the sealing of hot-sealable substrates, comprising:
  coating the coating system of claim 1 upon a substrate which is thereafter heat sealed to another substrate.

3. The process as claimed in claim 2, wherein the coating system is applied to an aluminum foil, which is thereafter sealed to a plastic selected from the group consisting of polypropylene, polyethylene, polystyrene, polyester and polyvinylchloride.

* * * * *